March 23, 1948. A. W. PRANCE 2,438,185
DOOR STRUCTURE FOR MOTOR VEHICLES
Filed Aug. 30, 1944 4 Sheets-Sheet 1

INVENTOR.
Alvin W. Prance.
BY
Gray & Smith
ATTORNEYS.

March 23, 1948.  A. W. PRANCE  2,438,185
DOOR STRUCTURE FOR MOTOR VEHICLES
Filed Aug. 30, 1944   4 Sheets-Sheet 2
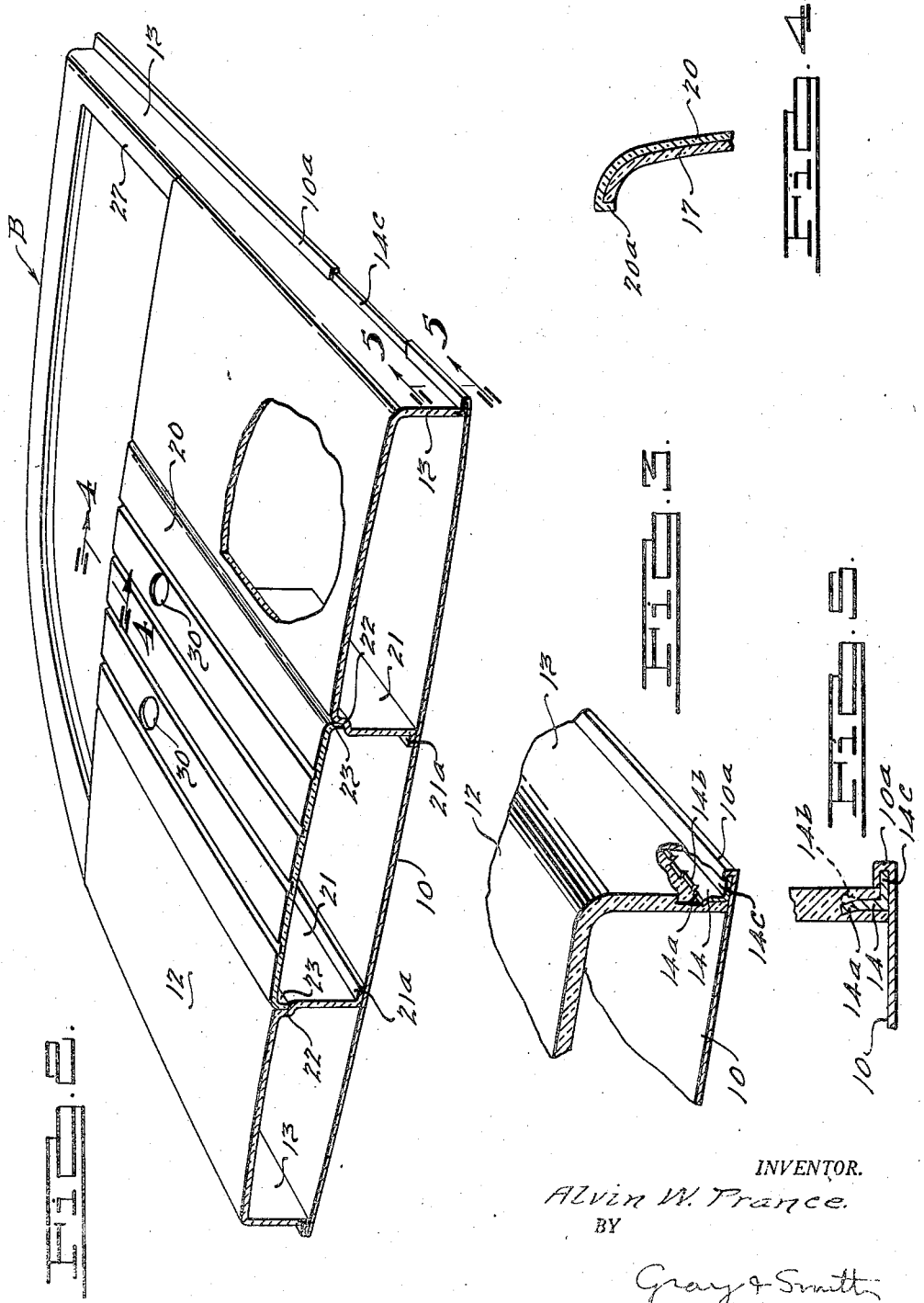
INVENTOR.
Alvin W. Prance.
BY
Gray & Smith
ATTORNEYS.

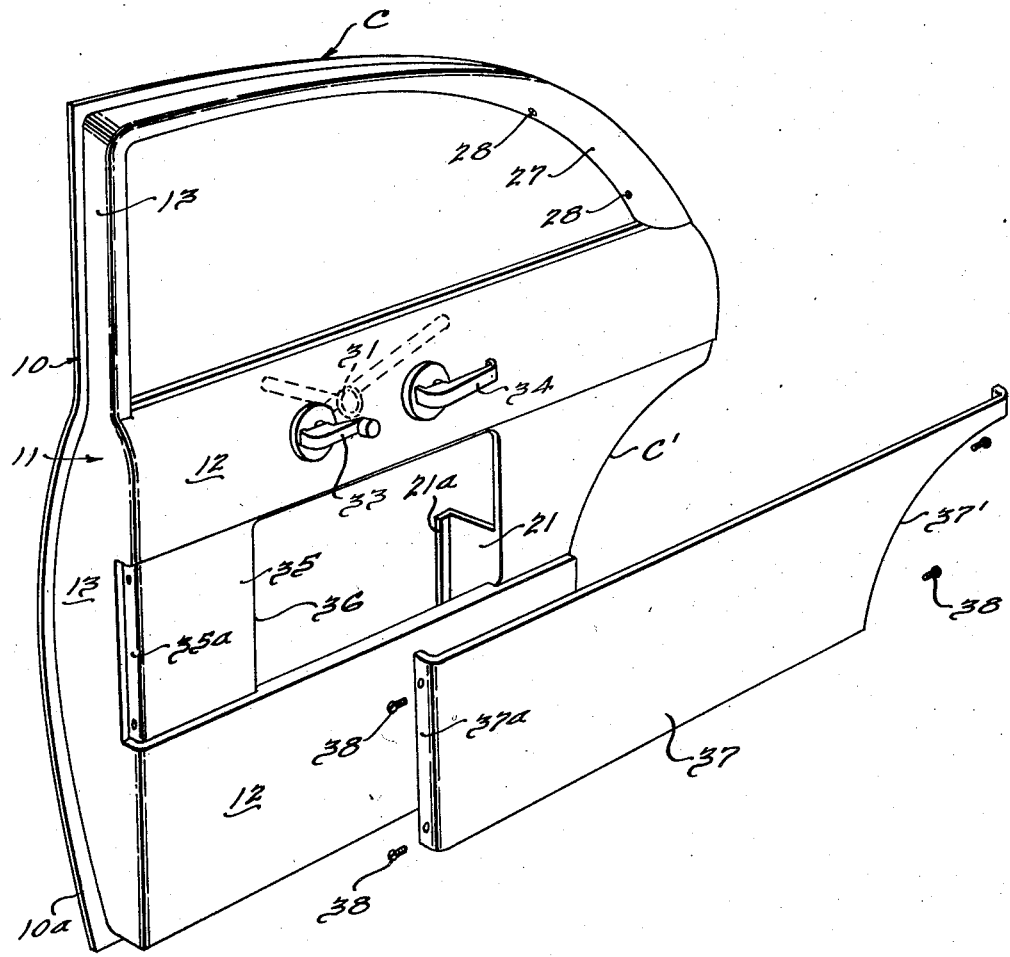

March 23, 1948.　　A. W. PRANCE　　2,438,185
DOOR STRUCTURE FOR MOTOR VEHICLES
Filed Aug. 30, 1944　　4 Sheets-Sheet 4
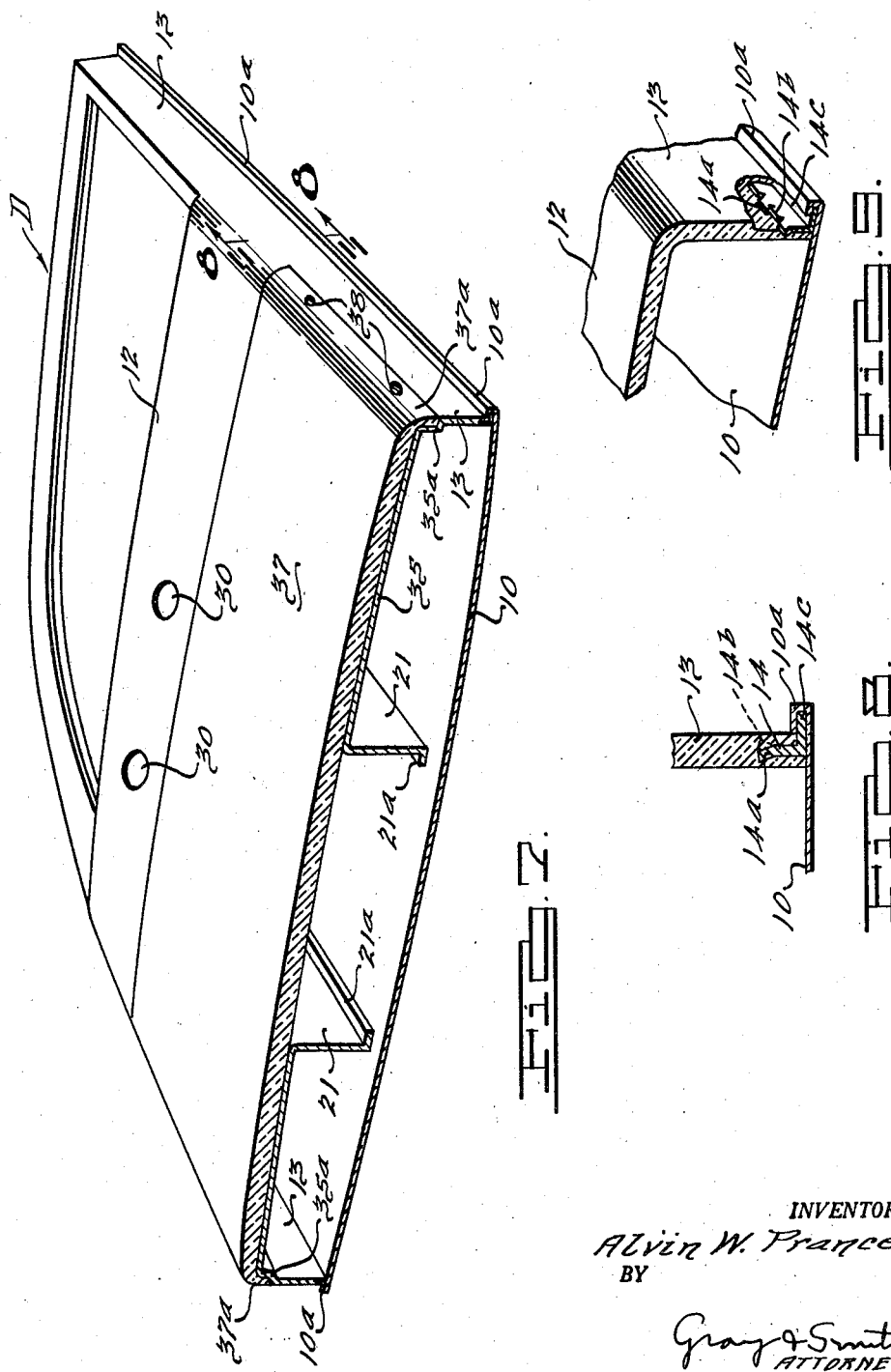
INVENTOR.
Alvin W. Prance.
BY
Gray & Smith
ATTORNEYS.

Patented Mar. 23, 1948

2,438,185

UNITED STATES PATENT OFFICE 2,438,185

DOOR STRUCTURE FOR MOTOR VEHICLES

Alvin W. Prance, Royal Oak, Mich., assignor to Briggs Manufacturing Company, Detroit, Mich., a corporation of Michigan Application August 30, 1944, Serial No. 551,789

15 Claims. (Cl. 296—44)

This invention relates to door structures and particularly, although not exclusively, to the doors of vehicle bodies, such as automobile bodies, an important object of the invention being to improve and simplify the construction of vehicle doors by eliminating structural and trim portions thereof commonly used in their fabrication while at the same time providing a door of adequate strength presenting a very neat and attractive appearance.

Heretofore it has been the conventional practice in the manufacture of doors of automobile bodies to construct the door with inner and outer metal panels secured together and spaced apart to provide the usual window well for housing such mechanisms as the window regulator and door lock, these being mounted upon the inner metal door panel. The inner door panel and operating mechanisms within the well are concealed at the inside of the body by means of a fabric covered trim panel which is removably secured in position by suitable fasteners. These trim panels are relatively expensive to manufacture and their cost together with other substantial costs incident to materials and labor involved in the construction of the door and the assembly of the various parts results in the doors of automobile bodies representing very substantial portions of the total cost of the bodies.

An object of the present invention, therefore, is to eliminate the necessity of providing the door with a double inner panel construction and to combine in one main inner panel the functions heretofore performed by the inner metal door panel and its covering trim panel.

A further object of the invention is to provide an improved door constructed principally of an outer metal panel and an inner plastic or non-metallic panel united together to form a structure having the requisite strength and rigidity as well as attractiveness in appearance.

Still another object of the invention is to provide a door in which the inner wall of the window well is formed of a single main panel preferably produced from plastic material and united to the outer metal panel of the door in improved manner.

Another object of the invention is to provide a door having an inner ornamental panel forming one wall of the window well and permanently secured to the outer metal panel around the edges thereof, provision being made for access to the window well by providing an opening or aperture in the inner panel removably closed by means of a panel member capable of enhancing the ornamental appearance of the door.

A further object of the invention is to provide a door having outer and inner panels spaced to provide a window well, the outer panel being of pressed metal and the inner panel of plastic material secured to the outer panel to provide a marginal door overlap flange along the outer edge of the door jamb, the latter being formed as a part of the inner panel.

Other objects of this invention will appear in the following description and appended claims, reference being had to the accompanying drawings forming a part of this specification wherein like reference characters designate corresponding parts in the several views.

Fig. 2 is a fragmentary perspective view, partly in section, of a front door of an automobile body, constructed in accordance with the present invention.

Fig. 3 is an enlarged fragmentary perspective view in section illustrating the manner in which the inner and outer panels of the door are joined together.

Fig. 4 is a section taken substantially through lines 4—4 of Fig. 2 looking in the direction of the arrows.

Fig. 5 is an enlarged section taken substantially through lines 5—5 of Fig. 2 looking in the direction of the arrows.

Fig. 6 is an exploded perspective view of the inside of a rear door of an automobile body illustrating another embodiment of the invention.

Fig. 7 is a sectional perspective view of the inside of a front door of an automobile body constructed substantially in accordance with the embodiment of Fig. 6.

Fig. 8 is an enlarged section taken through lines 8—8 of Fig. 7 looking in the direction of the arrows.

Fig. 9 is an enlarged fragmentary perspective view in section illustrating the manner in which the inner and outer panels are joined together in the embodiments of Figs. 6 and 7.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
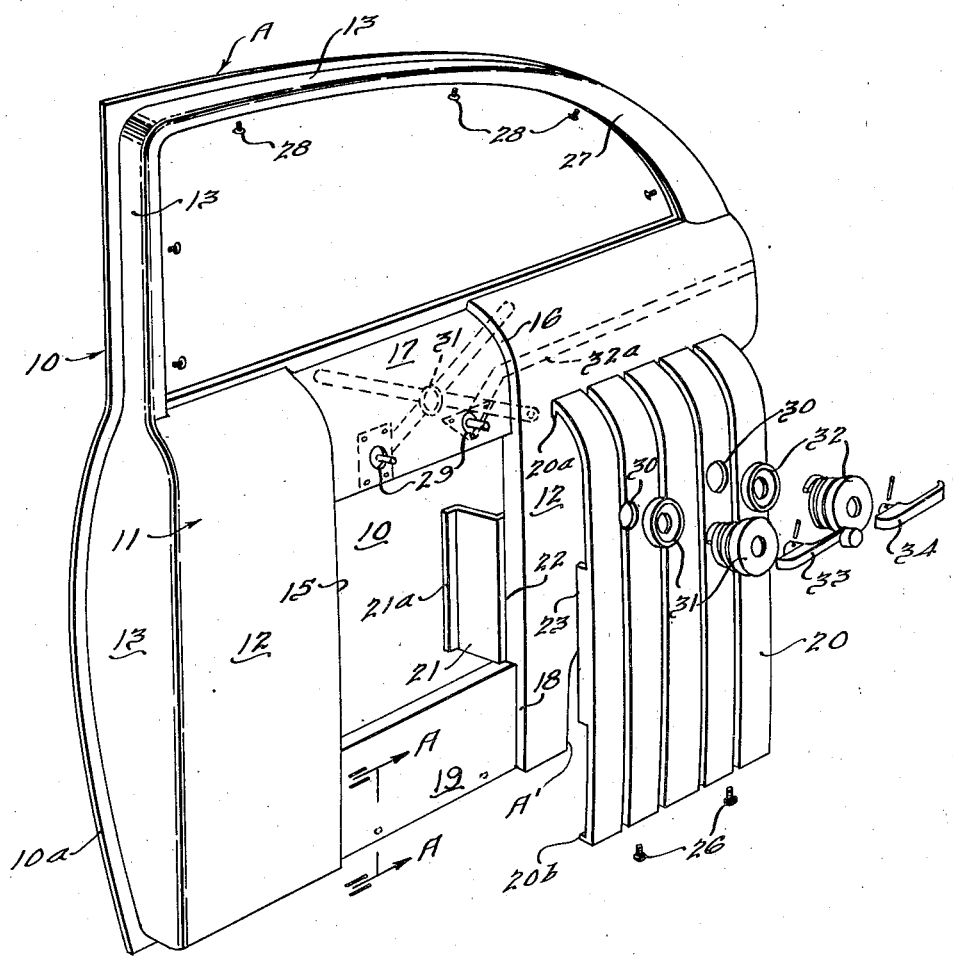
Fig. 1 is an exploded perspective view of the inside of a rear door of an automobile, constructed in accordance with the present invention.

Although in Figs. 1 and 2 I have illustrated a rear door and a front door, respectively, of an automobile body, the construction thereof is the same in all substantial particulars. Accordingly, corresponding parts of these doors are designated by the same reference characters since no substantial difference in structure exists between the two doors so far as this embodiment of the invention is concerned. The rear door of the automobile body is designated as a whole at A in Fig. 1 and the front door is designated at B in Fig. 2, these doors differing for the purposes of the present case only in shape and in the fact that the rear door is provided with the conventional dog leg A' to provide clearance for the wheel housing of the vehicle. In view of the substantial identity in construction between the two doors, the following description of either door will be understood to apply to both doors.

In the embodiment of Figs. 1 to 5 inclusive wherein the invention is illustrated, by way of example, as applied to the doors of an automobile body, the door in each instance comprises an outer stamped or pressed metal door panel 10, which may be formed of sheet steel, and an inner door panel 11 of suitable plastic material as hereinafter described. The inner plastic panel 11 is formed to the desired shape and contour and is provided with an inner generally vertically extending wall 12 extending in the general longitudinal direction of the outer metal panel 10 and spaced therefrom a suitable distance to provide a window well between the panels immediately below the window opening of the door. The inner wall 12 of the door panel 11 terminates around the upright sides and top of the door in an outwardly extending flange section 13 integral with the wall 12 and of varying width in order to suit the contour of the outer metal door panel 10.

As shown in Figs. 3 and 5, the marginal edge of the flange section 13 of the inner door panel abuts against the outer panel 10 entirely around the sides and top of the door. Embedded within the marginal edge portion of the flange section 13, as particularly shown in Figs. 3 and 5, is a metal reinforcing angle member 14. This angle member may be in one continuous length shaped to extend continuously around the upright sides and top of the door or may be made up of a plurality of sections extending end to end and embedded within the outwardly extending flange 13 of the inner door panel. One flange of the metal reinforcing and attaching angle member 14 is of requisite width in order to be embedded the desired distance within the marginal edge portion of the inner door panel flange 13. In order to firmly anchor the angle 14 in place the edge thereof is slitted and provided with reversely formed struck-out projections 14a and 14b. These projections serve the purpose of locking the angle 14 within the edge of the plastic inner door panel and assist in preventing the angle from buckling out or becoming displaced, thus providing the edge of the plastic inner door panel with a strong, rigid reinforced formation. The angle member 14 is provided with an outwardly projecting flange 14c of suitable width to permit the outer metal door panel 10 to be secured thereto. In the present instance the edge of the outer panel 10 is bent or crimped around the flange 14c as shown at 10a and rigidly secured thereto as by spot welding. This construction provides the projecting overlap flange of the door and also a strong and durable means for permanently uniting the inner plastic door panel 11 and the outer metal door panel 10.

In order to permit ready access to the various operating mechanisms within the window well of the door, such as the window regulator and lock mechanisms, the inner wall 12 of the panel 11 is provided with a vertically extending centrally disposed aperture or opening 15 which is of requisite width in order to properly insure access to the operating mechanisms from the inside of the door. The wall 12 is formed with an upper recess 16 producing an outwardly offset upper section 17 in the inner panel. The wall 12 is also formed with a lower recess 18 producing a correspondingly shaped lower offset section 19.

The aperture or opening 15 is adapted to be closed by means of a removable panel 20, preferably formed of the same material as the main panel 11. As shown in Figs. 1 and 4, the upper edge of the closure panel 20 is formed with a downwardly extending flange 20a adapted to fit into a correspondingly shaped notch or recess in the upper edge of the portion 17 and to overlap and conceal this edge. The closure panel 20 is also provided at its lower edge with an outwardly projecting flange 20b by means of which the closure member 20 may be removably secured to the bottom edge of the wall 12.

Figure 1A:
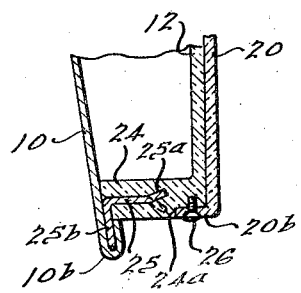
Fig. 1A is an enlarged section taken substantially through line A—A of Fig. 1 looking in the direction of the arrows.

Referring particularly to Fig. 1A, the bottom edge of the wall 12 of the inner plastic door panel is formed with an outwardly projecting flange 24 integral with the side flanges 13 and abutting against the bottom of the outer door panel 10. Embedded within this flange 24 is a reinforcing metal angle member 25 corresponding to the angle member 14 and either integral therewith or extending in substantially abutting relation thereto. The bottom angle member 25, as in the case of the angle member 14, is provided with reversely struck-out anchoring projections 25a and is also provided with a downwardly extending flange 25b of requisite width to enable the lower edge of the outer metal door panel 10 to be attached thereto. The attachment of the panel 10 to the flange 25b is preferably accomplished by bending or crimping the lower edge of the metal panel 10 around the projecting flange 25b, the parts being rigidly secured together as by spot welding.

From the foregoing construction it will, therefore, be seen that the door is provided with projecting overlap flanging 10a and 10b extending continuously around the four marginal edges of the door. As also illustrated in Fig. 1A, the lower flanged edge 20b of the closure panel 20 is adapted to fit within a recessed or notched portion 24a in the bottom of the flange 24 and the closure panel is removably secured within this recess by means of screws 26.

Referring to Figs. 1 and 2, the inner door panel is formed with outwardly projecting flange sections 21 extending from the marginal edges of the opening 15. These flange sections terminate in edge flanges 21a positioned to engage the outer metal panel 10 and brace or support it against buckling or vibration. At the juncture of the wall 12 and the flange sections 21 the inner panel is provided with offset recesses 22 within which are seated correspondingly shaped flanges 23 formed on the closure panel 20 intermediate the upper and lower edges thereof. The depth of the upper and lower recesses 16 and 18 are preferably such as to correspond to the thickness of the closure panel 20 so that when the closure panel is placed in position over the aperture 15 it will engage the offset sections 17 and 19 with the outer surface of the closure panel lying substantially flush with the outer surface of the wall 12 and with the flange portions 23 seated within the offsets 22.

The inner edge of the window reveal may be finished, after assembly of the glass within the window opening, by means of an ornamental garnish molding 27 which is preferably formed of the same material as the inner door panel 11. The garnish molding preferably fits within a recess in the inner door panel formed around the window opening so as to lie flush with the adjacent portions of the inner panel. After installation of the garnish molding it may be removably secured in position by means of screws 28 extending through the molding into the adjacent portions of the inner door panel 11.

The offset section 17 of the inner door panel 11 provides a support for the window regulator and lock mechanism which is housed within the window well. These mechanisms are of any conventional construction, well known in the art, and are suitably secured, as indicated in Fig. 1, to the inner side of the offset wall section 17 of the inner panel, the window regulator being generally indicated at 31 and the remote control portion of the door lock generally indicated at 32. The wall section 17 is provided with apertures 29 registering with apertures 30 in the closure panel 20 and through which the handle shafts and associated parts of the window regulator and door lock mechanism project and which are controlled from the inside of the panel 11 by means of the usual operating handles 33 and 34. The door lock handle 34 is remotely mounted with respect to the latch bolt, as is customary, and operates the same through the medium of the usual remote control mechanism 32a supported within the window well.

In the embodiment of the invention illustrated in Figs. 6 to 9 inclusive the construction of the door is substantially the same as that previously described with the exception of the manner in which the opening or aperture providing access to the window well through the inner door panel is closed. In Fig. 6 there is illustrated a rear door C for an automobile body and in Fig. 7 there is illustrated a front door D, these doors being similar in construction but differing in shape or configuration and the fact that the rear door is provided with the usual dog-leg C' for the purpose of affording clearance for the door at the wheel housing. Since the construction of the rear and front doors C and D is identical, except as above noted, similar reference characters are applicable to corresponding parts in the following description.

In this embodiment the door in each instance comprises an outer pressed metal door panel 10 and an inner door panel 11 of plastic material. These panels correspond to the similar inner and outer door panels of the previous embodiment and are secured together through the medium of the angle members 14 in the manner shown particularly in Figs. 8 and 9, this construction corresponding to that utilized in connection with the previous embodiment of the invention. The attaching means 14 by which the panels are united may, if desired, be in the form of a single four-sided frame extending continuously around the four sides of the door and embedded in the edges of the flange portions 13 of the inner door panel during the formation of the latter. However, it will be understood that this attaching means may comprise several angular sections 14 disposed in abutting relation and extending around the margins of the door.

As illustrated in Figs. 6 and 7, the inner wall 12 of the door panel 11 is formed with a recessed portion 35 extending transversely from one side edge to the other of the panel and terminating at opposite ends in angularly extending recessed portions 35a formed in the flange or jamb portions 13 of the panel. An aperture or opening 36 of suitable size is cut in the inner panel and lies between the upper and lower edges of the recess portion 35. Extending outwardly from opposite edges of the opening 36 are integral flange portions 21 terminating in edge flanges 21a positioned to engage the outer door panel 10, this construction being substantially the same as that shown and described in connection with the previous embodiment. The opening 36, through which access may be had to the window regulator and lock mechanisms within the window well, is closed by means of a removable closure panel 37 shaped to fit within the recessed portion 35, the latter preferably having a depth corresponding substantially to the thickness of the closure panel. In the case of the rear door C the closure panel 37 will be cut away at 37' in order to conform to the cut away portion C' of the door, as illustrated in Fig. 6. In the case of a front door D, the closure panel 37 will be formed without the cut away portion 37' in the manner shown in Fig. 7. The closure panel at opposite ends thereof is provided with outwardly extending flange portions 37a adapted to fit within the recessed portions 35a at opposite jamb faces of the door and the panel, after being fitted into the recessed portions 35, 35a, may be removably secured in position by means of screws 38 extending through the flanges 37a and threaded into tapped holes in the bottom of the recessed portions 35a.

In the embodiment of Figs. 6 and 7 the window regulator and lock mechanisms are mounted upon the fixed or permanent upper portion of the wall 12 of the inner panel instead of upon the removable closure panel as in the previous embodiment. The handle shafts of these mechanisms and associated parts project through apertures 30 in the wall 12 and carry the operating handles 33 and 34 as illustrated in Fig. 6.

From the foregoing it will be seen that the present improved door is constructed principally of a single inner panel, preferably of plastic material, and a single outer metal panel, these panels being spaced apart to provide the window well and being rigidly secured together in permanent manner around the edges of the door to provide the door overlap flanges. The inner panel is formed as a structural member having the requisite strength to provide in combination with the outer metal panel a strong and rigid structural unit. The inner plastic panel not only forms the inner wall of the window well but also carries any desired design, pattern or ornamentation on its inner surface to lend attractiveness to the door. This inner panel not only provides the inner wall of the window well but also forms the marginal frame portions of the window opening of the door. In addition, the inner panel forms the entire jamb edges of the door around all four sides thereof.

The plastic material used in making the inner door panel may be of any suitable type and composition which will afford the requisite properties of strength and rigidity when molded, pressed or otherwise formed into the inner door panel. In addition, the material selected in the fabrication of the panels should preferably be susceptible to ornamentation so as to present the desired attractiveness in appearance to the inside of the door. Thermoplastic and thermo-setting resinous materials suitably reinforced with fibrous substances to add structural strength thereto are suggested for the manufacture of the panels since they readily lend themselves to pigmentation to produce any desired color combinations and the panels may be imprinted with various ornamental designs having the properties or characteristics not only of beauty but also permanency and stability against impairment after continued usage. In using thermo-setting resinous materials, such as resins of the phenol-formaldehyde, urea formaldehyde and melamine types, the fibrous reinforcing material is incorporated in the foundation sheet and this sheet may be combined under heat and pressure with an outer relatively thin sheet or sheets of requisite transparency printed with the inked design or pattern and impregnated with the resin. The sheets before their union may be pigmented as desired and the final panel when molded or pressed to shape will not only have considerable structural, impact and bending strength but will present a highly attractive appearance. Manufacture of the panels may be carried out in accordance with the disclosure of copending applications Ser. No. 513,080, now Patent No. 2,410,361, granted October 29, 1946, and Ser. No. 543,852, filed July 7, 1944.

I claim:

1. A door structure comprising an outer metal panel and an inner non-metallic panel spaced apart and secured together around their marginal edges, the inner panel having an opening between opposite edges thereof and recessed portions at opposite sides of the opening, and a closure panel for said opening having edge flanges fitting into said recessed portions.

2. A door structure comprising an outer metal panel and an inner non-metallic panel spaced apart and secured together around their marginal edges, the inner panel having an opening between opposite edges thereof and recessed portions at opposite sides of the opening, a closure panel for said opening having portions fitting into said recessed portions, and brace members projecting outwardly from the edges of said opening into abutting relation to the outer panel.

3. A door structure comprising an outer metal panel and an inner non-metallic panel spaced apart and secured together around their marginal edges, the inner panel having an opening between opposite side edges thereof affording access to the space between the panels, the edges of said opening having offset portions, and a closure panel for said opening having edge flanges seated on said offset portions.

4. A door structure comprising an outer metal panel, an inner plastic panel having an inner generally vertical wall terminating in integral outward flange portions providing a continuous jamb face around the margins of the door, said flange portions abutting against the outer panel and having reinforcing metal members embedded therein and secured to the edges of the outer panel to provide door overlap flanges projecting in the general plane of the outer panel beyond said flange portions of the inner panel.

5. A door structure comprising an outer pressed metal panel, an inner plastic panel having a main inner wall terminating in an outwardly and transversely extending flange, and a metallic angle member having a flange portion embedded in said flange and a second flange portion projecting outwardly of said flange in juxtaposed relation to the outer panel and secured thereto.

6. A door structure comprising an outer pressed metal panel and an inner plastic panel spaced apart, the inner panel terminating in an outwardly directed integral flange extending proximate to the outer panel, and a metal member having a flange portion in the plane of said flange embedded therein and a second flange portion projecting angularly and outwardly of the edge of said inner panel flange in juxtaposed relation to the outer panel and secured to the latter to provide a door overlap flange projecting beyond said inner panel flange.

7. A door structure comprising an outer pressed metal panel and an inner plastic panel spaced apart, the inner panel terminating in an outwardly directed integral flange extending proximate to the outer panel, and a metal member having a flange portion in the plane of said flange embedded therein and a second flange portion projecting angularly and outwardly of the edge of said inner panel flange in juxtaposed relation to the outer panel, the edge of the outer panel being bent around the edge of said second flange portion to secure the outer panel and member together and to provide a door overlap flange projecting beyond said inner panel flange.

8. A door structure comprising an outer pressed metal panel and an inner plastic panel spaced apart, the inner panel terminating in an outwardly directed integral flange extending proximate to the outer panel and forming the jamb of the door, and a metal member having a flange portion in the plane of said flange embedded and permanently anchored therein and a second flange portion projecting angularly and outwardly of the edge of said inner panel flange in juxtaposed relation to the outer panel and secured to the latter to provide a door overlap flange projecting beyond said inner panel flange.

9. A door structure comprising an outer pressed metal panel and an inner plastic panel spaced apart, the inner panel terminating in outwardly directed flanges extending proximate to the outer panel to provide door jamb portions, means for securing adjacent edges of the outer panel and said flanges together, the inner panel having an opening between opposite edges, and a closure panel for said opening fitting into a recessed portion in the inner panel and extending from one edge of the inner panel to the opposite edge thereof and having an end flange fitting into a recess in the jamb portion of the inner panel.

10. A door structure comprising an outer pressed metal panel and an inner plastic panel spaced apart, the inner panel terminating in outwardly directed flanges, means for securing adjacent edges of the outer panel and certain of said flanges together, the inner panel having an opening between opposite edges, and a closure panel for said opening fitting into a recessed portion in the inner panel and extending from one edge of the inner panel to the opposite edge thereof and having an end flange overlapping the edge of one of said inner panel flanges.

11. A door structure comprising an outer pressed metal panel and an inner plastic panel spaced apart, the inner panel terminating in outwardly directed flanges extending proximate to the outer panel to provide door jamb portions, means for securing adjacent edges of the outer panel and said flanges together, the inner panel having an opening between opposite edges, a closure panel for said opening fitting into a recessed portion in the inner panel and extending from one edge of the inner panel to the opposite edge thereof and having an end flange fitting into a recess in the jamb portion of the inner panel, and means for securing said end flange to said jamb portion.

12. A door structure comprising an outer pressed metal panel and an inner plastic panel spaced apart to form a window well therebetween, a metallic member having a part secured to said plastic panel and a part extending proximate to the edge of the outer panel and said edge being secured to said last part, said inner panel having an aperture providing access to said well, and a closure for said aperture removably secured to said inner panel and extending into a recessed portion thereof, said closure extending from the upper edge to the lower edge of the plastic panel and having inwardly extending end flanging overlapping at least one of said edges.

13. A door structure comprising an outer pressed metal panel and an inner plastic panel spaced apart to form a window well therebetween, a metallic member having a part secured to said plastic panel and a part extending proximate to the edge of the outer panel and said edge being secured to said last part, said inner panel having an aperture providing access to said well, and a vertically extending closure for said aperture removably secured to said inner panel and extending into a recessed portion thereof, said closure extending from the upper edge to the lower edge of the plastic panel and having inwardly extending end flanging overlapping at least one of said edges.

14. A door structure comprising an outer pressed metal panel and an inner plastic panel spaced apart to form a window well therebetween, a metallic member having a part secured to said plastic panel and a part extending proximate to the edge of the outer panel and said edge being secured to said last part, said inner panel having an aperture providing access to said well, and a horizontally extending closure for said aperture removably secured to said inner panel and extending into a recessed portion thereof, said closure extending from one side edge to the opposite side edge of the plastic panel and having inwardly extending end flanging overlapping at least one of said edges.

15. A door structure comprising an outer metal panel and an inner plastic panel provided along opposite edges with outwardly extending portions spacing the panels apart, metallic angle members having flanges extending in the plane of and embedded in said portions and additional flanges projecting angularly and outwardly therefrom, said outer panel having portions extending in juxtaposed relation to said last named flanges and bent around the edges thereof to secure the panels together.

ALVIN W. PRANCE.

REFERENCES CITED

The following references are of record in the file of this patent:

UNITED STATES PATENTS

| Number | Name | Date |
| --- | --- | --- |
| 1,681,941 | Ledwinka | Aug. 28, 1928 |
| 1,701,574 | Ledwinka | Feb. 12, 1929 |
| 2,075,689 | Zinser | Mar. 30, 1937 |
| 2,150,476 | Woodall | Mar. 14, 1939 |
| 2,187,331 | Schulz et al. | Jan. 16, 1940 |
| 2,223,740 | Quest | Dec. 3, 1940 |
| 2,387,317 | Cunnington | Oct. 23, 1945 |

FOREIGN PATENTS

| Number | Country | Date |
| --- | --- | --- |
| 285,743 | Great Britain | Feb. 23, 1928 |
| 430,943 | Germany | June 25, 1926 |
| 510,924 | Great Britain | Aug. 10, 1939 |
| 513,292 | Great Britain | Oct. 9, 1939 |